United States Patent [19]

Hartwig

[11] Patent Number: 5,077,898
[45] Date of Patent: Jan. 7, 1992

[54] TRIMMER SHIELD AND MOUNTING

[75] Inventor: James J. Hartwig, Fox Lake, Wis.

[73] Assignee: Deere & Company, Moline, Ill.

[21] Appl. No.: 558,048

[22] Filed: Jul. 25, 1990

[51] Int. Cl.$^5$ .......................... A01G 3/06; B26B 27/00
[52] U.S. Cl. ........................................ 30/276; 30/286;
30/34.7; 30/DIG. 5; 30/298.4; 56/12.7
[58] Field of Search ...................... 30/276, 347, 298.4,
30/286, DIG. 5; 56/12.5, 12.7

[56] References Cited

U.S. PATENT DOCUMENTS

| | | | |
|---|---|---|---|
| 3,859,776 | 1/1975 | Ballas et al. | 56/12.7 |
| 4,209,902 | 7/1980 | Moore et al. | 30/276 |
| 4,475,287 | 10/1984 | Beihoffer | 30/276 |
| 4,702,005 | 10/1987 | Pittinger, Sr. et al. | 30/347 |
| 4,744,148 | 5/1988 | Brown | 30/276 |
| 4,864,728 | 9/1989 | Kloft et al. | 30/286 |

OTHER PUBLICATIONS

Inertia Dynamics Corp., Chandler, Arizona; *Ryan-The Most Powerful;* 4 pages; dated 1987, published in U.S.A.
Maruyama, Redmond, Washington; *Maruyama-The Name in Power-Power Equipment;* 6 pages, dated 1987, published in U.S.A.
The Toro Company; *Toro-Introducing Toro's New High--Performance Gas Trimmers;* 6 pages, dated 1986; published in U.S.A.
Snapper Power Equipment, McDonough, Ga.; *Snapper-Trimmer/Brush Cutter,* 4 pages, dated 1986, published in U.S.A.

*Primary Examiner*—Hien H. Phan
*Assistant Examiner*—Raymond D. Woods

[57] ABSTRACT

A shield and structure for mounting the shield to a hand held grass trimmer is provided. The generally flat shield is perpendicularly mounted to a gear box extension which is carried coaxial with the drive shaft tube. Twisting and moment forces incurred by the shield when the trimmer is resting on the ground are reduced by mounting the shield to support the weight of the trimmer generally perpendicular to the length of the drive shaft tube. The mounting structure prevents sliding of the shield on the drive tube and provides multiple attaching members to prevent rotation of the shield on the drive tube.

2 Claims, 1 Drawing Sheet

TRIMMER SHIELD AND MOUNTING

BACKGROUND OF THE INVENTION

The present invention relates to hand held trimmers used to cut grass, weeds and light brush and, more particularly, to the means for mounting a shield on a trimmer.

DESCRIPTION OF THE RELATED ART

Hand held trimmers are utilized to cut grass, weeds and other vegetation where mowers and/or larger lawn and garden equipment cannot easily reach. These trimmers are particularly useful for cutting grass around walls, fences, buildings and similar structures adjacent yards. Trimmers typically include a power unit coupled with a drive shaft which extends through a tube to drive a gear box joined to a cutter head. The cutter head in turn carries a string cutter or blade cutting element. These units are easily carried by a single person and, being light and portable, convenient for trimming along walls, walks and other structures. To protect the operator from the cutting element as it is rotating and to also shield him against vegetation and/or other objects which may be flung outwardly from the cutting element, there is generally provided a shield adjacent the cutting head.

Many present trimmers attach the shield to the cutting head. Because the trimmers are designed to be carried by an individual while they are operating, the cutting head is connected to the drive shaft and tube at an angle to operate parallel to the ground. Shields which are connected to the cutting head are therefore often connected to the portion of the trimmer which extends at an angle to the drive shaft. Accordingly, the shield is positioned at an angle with respect to the drive shaft tube.

After use, an operator will generally load the trimmer into his vehicle for transport or lay it on the ground. Typically the trimmer will be supported parallel to its length, resting on the engine and trimmer shield. When the shield is attached at an angle with respect to the tube, the moment forces through the shield created by the weight of the trimmer tend to distort and/or break the shield where it is attached to the cutter head.

Some trimmer shields are connected to the drive shaft tube by an arrangement which positions them directly beneath the drive shaft and tube when the trimmer is laid down. Many of these trimmers, however, orient the trimmer shield at an angle with respect to the tube so that it shields the rotating cutter element. Accordingly, these shields encounter the same problem when the trimmer is laid down. Further, many of the attaching structures for these shields are clamp arrangements which allow the shield to rotate or slide along the shaft and move from the desired location with respect to the cutting element of the trimmer.

SUMMARY OF THE INVENTION

It is, therefore, an object of the present invention to provide a mounting mechanism for securing the shield of a trimmer to the lower end of the trimmer whereby the operator is protected from the cutting element and debris thrown by the rotating cutting element.

It is further an object to provide a mounting mechanism which substantially reduces the movement and/or twisting forces encountered by the shield. The mechanism secures the shield to the trimmer so that when the trimmer is laid down for transport and supports the trimmer's weight and/or the weight of objects placed on top of it, the forces on the shield will be directed generally perpendicular through the shield and to the shaft.

It is further an object to provide a means for securing the shield to the trimmer which prevents the shield from sliding along the shaft tube of the trimmer or moving out of its desired position.

DESCRIPTION OF THE PREFERRED EMBODIMENT

Figure 1:
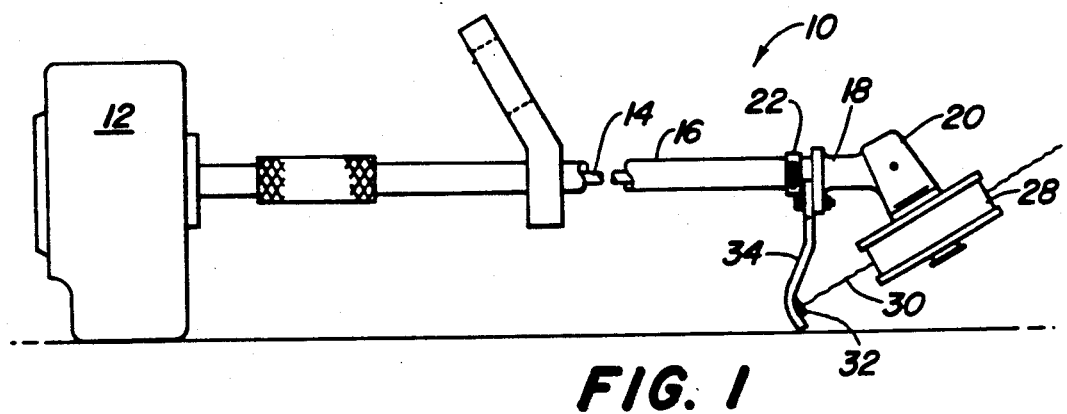
FIG. 1 is a partial side view of a trimmer with the new shield and its attaching structure, the trimmer being at rest as it would be during transport.

Looking now to FIG. 1, there is illustrated a string trimmer or trimmer 10 lying on its side as it would be during transport. The trimmer 10 includes an engine 12, that engine 12 being gas powered in the preferred embodiment; however, an electric power source could be provided. The engine 12 drives a power shaft 14 which extends through the sleeve or tube designated 16. The tube 16 is clamped to a die-cast extension or casting 18 which is connected at an angle with the gear box or trimmer head 20. A clamp 22 secures the casting 18 to the tube 16, through use of bolts 24 and nuts 26. The gear box 20 carries a cutter head 28 wherein string 30 (nylon or other co-polymer) is mounted as the preferred cutting element. A knife or line limiter 32 is carried by a shield 34 which is mounted to the casting 18.

Figure 2:
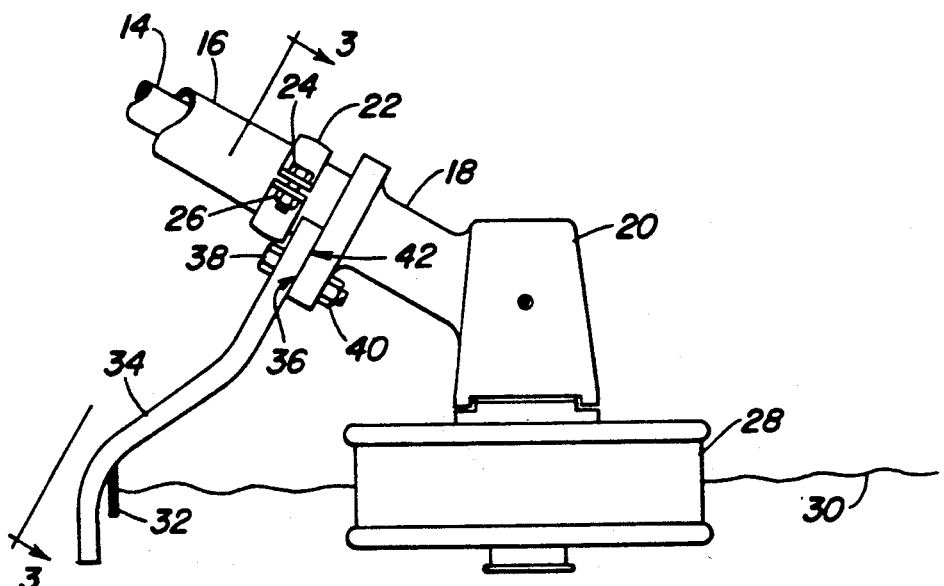
FIG. 2 is an enlarged side view of the shield and its mounting mechanism.
Figure 3:
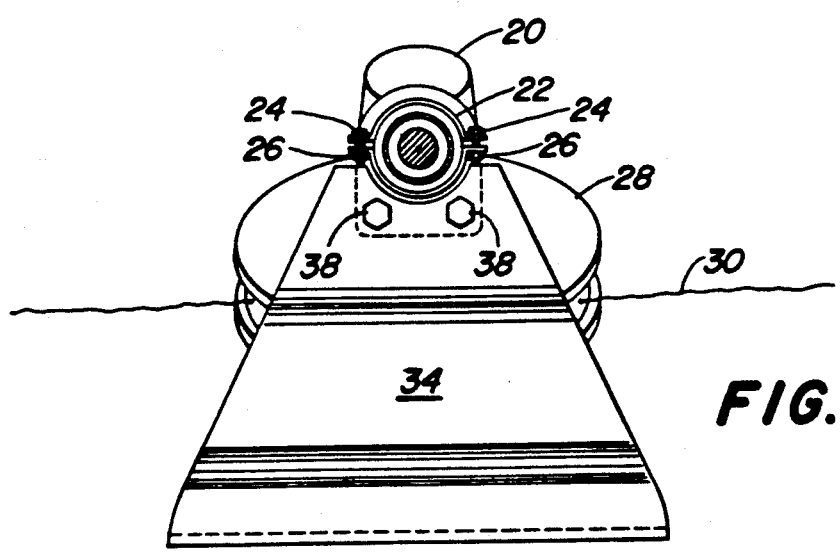
FIG. 3 is a enlarged view of the shield and its mounting mechanism taken along lines 3—3 of FIG. 2.

Looking now to FIG. 2, there is better illustrated the mounting structure for carrying the trimmer shield 34. The die-cast extension 18 carried on the gear box 20 includes a flat mounting surface 36 with a pair of openings for receiving bolts 38 that would project through compatibly sized and placed openings formed in the shield 34. The bolts 38 are secured with nuts 40, as best illustrated in FIG. 2.

The mounting surface 36 carried on the die-cast portion 18 of the gear box 20 and the mounting surface 42 carried on the shield are oriented perpendicular to the sleeve or tube 16, as best illustrated in FIGS. 1 and 2. The shield 34, which is generally flat, is carried substantially perpendicular to the shaft 14 when mounted. Therefore, placement of the trimmer 10 on the ground or in a trunk or bed of a truck would result in the shield 34 being positioned as illustrated in FIG. 1 and the forces encountered by the shield 34 as it supports the weight of the trimmer head 20, tube 16, and engine 12 and any other objects placed upon the trimmer would be substantially perpendicular to the shield where it mounts to the tube 16. Accordingly, bending forces, which could serve to weaken and finally cause a fracture in the shield 34 are minimized.

I claim:

1. A hand held trimmer having
   a power source including a first trimmer support surface;
   an elongated power shaft driven by the power source;

a gear box operatively coupled with the power shaft, the gear box including a casting fixed thereto and extending therefrom at an acute angle, the casting being generally cylindrical and extending from the power shaft;

a cutter head attached to the gear box, said cutter head including a cutting element driven by the gear box;

an elongated generally flat cutter element shield having one portion connected to the casting and a second portion having a second trimmer support surface;

and means for mounting the one portion of the shield generally perpendicular to the power shaft including first and second mating surfaces on the shield and the casting, respectively, for mounting the shield generally perpendicular to the power shaft, and means for detachably connecting the first and second surfaces together.

whereby the trimmer when resting on the ground is supported by the first and second trimmer support surfaces, the power shaft is generally parallel to the ground and the shield extends generally perpendicular between the power shaft and the ground.

2. The invention defined in claim 1 wherein the mating surface carried by the casting is oriented generally perpendicular to the power shaft and includes means for securing the shield's mating surface to at least two spaced locations on the mating surface of the casting.

* * * * *